United States Patent [19]

Hess et al.

[11] Patent Number: 4,839,330

[45] Date of Patent: Jun. 13, 1989

[54] ISOTOPE EXCHANGE IN OXIDE-CONTAINING CATALYST

[75] Inventors: Robert V. Hess, Newport News; Billy T. Upchurch; Kenneth G. Brown, both of Virginia Beach; Irvin M. Miller, Newport News; David R. Schryer, Hampton; Barry D. Sidney, Gloucester; George M. Wood, Newport News; Ronald F. Hoyt, Tabb, all of Va.

[73] Assignee: The United States of America as repesented by the Administrator of the National Aeronautics and Space Administration, Washington, D.C.

[21] Appl. No.: 145,719

[22] Filed: Jan. 15, 1988

Related U.S. Application Data

[63] Continuation of Ser. No. 874,304, Jun. 12, 1986, abandoned.

[51] Int. Cl.$^4$ .......................... B01J 38/10; B01J 38/12
[52] U.S. Cl. ................... 502/53; 204/157.51; 372/59; 502/38; 502/339; 502/352
[58] Field of Search ................ 502/53, 38, 339, 352; 423/618; 204/157.5, 157.21, 157.22, 157.51; 372/59

[56] References Cited

U.S. PATENT DOCUMENTS

| | | | |
|---|---|---|---|
| 2,787,598 | 4/1957 | Hammar | 502/53 |
| 3,803,052 | 4/1974 | Hayes | 502/53 |
| 4,225,530 | 9/1980 | Deisner et al. | 502/53 |
| 4,343,687 | 8/1982 | Ronn | 204/157.47 |
| 4,359,400 | 11/1982 | Landolt et al. | 502/53 |
| 4,437,958 | 3/1984 | Rockwood et al. | 204/157.5 |
| 4,490,482 | 12/1984 | Mathieu | 502/339 |
| 4,492,769 | 1/1985 | Blanchard et al. | 502/339 |
| 4,524,051 | 6/1985 | Wright et al. | 423/213.5 |
| 4,536,375 | 8/1985 | Holt et al. | 502/352 |

FOREIGN PATENT DOCUMENTS 2028571  3/1980  United Kingdom ................ 502/339

*Primary Examiner*—Anthony McFarlane
*Attorney, Agent, or Firm*—George F. Helfrich; John R. Manning; Charles E. B. Glenn

[57] ABSTRACT

A method of exchanging rare-isotope oxygen for common-isotope oxygen in the top several layers of an oxide-containing catalyst is disclosed. A sample of an oxide-containing catalyst is exposed to a flowing stream of reducing gas in an inert carrier gas at a temperature suitable for the removal of the reactive common-isotope oxygen atoms from the surface layer or layers of the catalyst without damaging the catalyst structure. The reduction temperature must be higher than any at which the catalyst will subsequently operate. Sufficient reducing gas is used to allow removal of all of the reactive common-isotope oxygen atoms in the top several layers of the catalyst. The catalyst is then reoxidized with the desired rare-isotope oxygen in sufficient quantity to replace all of the common-isotope oxygen that was removed.

15 Claims, No Drawings

ISOTOPE EXCHANGE IN OXIDE-CONTAINING CATALYST

This application is a continuation of application Ser. No. 874,304, filed June 12, 1986 abandoned.

ORIGIN OF THE INVENTION

The invention described herein was made jointly in the performance of work under NASA Contract Nos. L-79510B and L-83135B with Chemicon and NASA Contract NAS1-17993 with Old Dominion Research Foundation and employees of the U.S. Government. In accordance with 35 USC 202, the contractors have elected not to retain title.

BACKGROUND OF THE INVENTION

This invention relates generally to the process of isotope exchange and in particular to the oxygen isotope exchange on an oxide-containing catalyst.

New approaches for extending the life of lasers used in space applications are under investigation. One aspect of the rapid progress in this area is that new techniques for long lifetime space applications of high pulse-energy, common and rare isotope, closed-cycle $CO_2$ lasers are being studied. The high-energy pulsed $CO_2$ laser must be operated closed-cycle to conserve gas, especially if rare isotope gases are used. Rare-isotope gases, such as $C^{18}O_2$, are used for improved transmission of the laser beam in the atmosphere.

The electrons in electric-discharge $CO_2$ lasers cause dissociation of some $CO_2$ into $O_2$ and $CO$ and attach themselves to electronegative molecules such as $O_2$, forming negative $O_2^-$ ions, as well as larger negative ion clusters by collisions with CO or other molecules. For closed-cycle, sealed $CO_2$ laser operation, the concentration of negative ions/clusters may become sufficiently high to form discharge instabilities which may ultimately disrupt the $CO_2$ laser operation. The decrease in $CO_2$ concentration due to dissociation into CO and $O_2$ will reduce the average repetitively pulsed or continuous wave (CW) laser power, even if no disruptive negative ion instabilities occur. In order to maintain laser power, i.e., maintain $CO_2$ concentration and reduce negative ion formation, the recombination rates of CO and $O_2$ must be increased, or the dissociation reduced. In essence, there are two techniques to accomplish these goals. One involves modification of the $CO_2:N_2:He$ laser mixture to increase the recombination and modification of the electric discharge behavior to reduce the dissociation. The other involves CO—$O_2$ recombination, catalyzed by solid-state catalysts with sufficiently high recombination rates at temperatures which are not excessive and which may be attained by heating from the laser medium or other means of using the dissipative non-lasing power.

The catalysts which function well at such lower temperatures, generally obtain oxides which can participate somewhat in the recombination process. Participation is through oxidation of the dissociation product, CO, by the catalyst, and concurrent reoxidation of the catalyst oxide by the other dissociation product, $O_2$. These two steps permit a reactive oxide catalyst to function as a true catalyst which maintains its structure during the catalytic recombination process. Thus, the interaction of the catalyst oxides with the dissociation products CO and $O_2$ occurs, in part, through reaction of the oxygen in the catalyst with CO, forming $CO_2$, and replenishment of the oxygen lost from the catalyst with the dissociation product $O_2$. Recalling that laser operation using a rare isotope such as $C^{18}O_2$ provides improved atmospheric transmission, it would therefore be desirable to provide a catalyst capable of catalyzing CO—$O_2$ recombination involving a rare oxygen isotope without any introduction of common-isotope oxygen from the catalyst into the gas molecules.

The first technique, that is, modification of the $CO_2:N_2:He$ laser mixture to increase recombination, involves additions of CO to the laser gas. However, the second technique is more advantageous in that solid catalysts can provide higher $CO/O_2$ recombination rates than gas additions with resulting lower average power reduction and higher efficiency of closed-cycle, repetitively pulsed or CW lasers. Higher operating temperature ($\geq 200°$ C.) catalysts such as Pt or Pd alone or on some non-interactive substrate, such as $Al_2O_3$, have been frequently used to achieve high recombination rates. The purpose of substrates is to increase the catalyst surface area and offer support. However, the necessity for external heating to high temperatures reduces the total system efficiency for space based operation, and is also undesirable for other contemplated applications. To conserve energy, the catalyst must be active at or below 100° C., the temperature inside the laser envelope. Neither technique currently known in the prior art will provide for such operation at long lifetimes.

Accordingly, it is an object of the present invention to develop a catalyst that will provide for the recombination process using a rare oxygen isotope such as $^{18}O$ within a closed-cycle, $CO_2$ laser without loss of isotopic integrity in the laser gas.

It is a further object of the present invention to develop a catalyst that will provide active recombination within the closed-cycle, $CO_2$ laser without any additional heating of the catalyst.

A still further object of the present invention is to provide a catalyst that will provide for active recombination over a long period of time.

Other objects and advantages of the present invention will be readily apparent from the following description of a preferred embodiment of the present invention.

SUMMARY OF THE INVENTION

A sample of an oxide-containing catalyst is exposed to a flowing stream of reducing gas in an inert carrier gas at a temperature suitable for the removal of the common oxygen isotope from the surface layer or layers of the catalyst without damaging the catalyst structure. The reduction temperature must be higher than any at which the catalyst will subsequently operate. Sufficient reducing gas is used to allow the removal of all of the reactive common oxygen isotope in the top several layers of the catalyst. The catalyst is then reoxidized with the desired rare oxygen isotope in sufficient quantity to replace all of the common oxygen isotope that was removed.

DETAILED DESCRIPTION OF THE INVENTION

The high-energy pulsed $CO_2$ laser must be operated closed-cycle to conserve gas, especially if rare isotope gases are used. Such rare isotope gases as $C^{18}O_2$ are used for improved transmission of the laser beam in the atmosphere. However, closed-cycle operation results in a rapid power loss caused by the dissociation of $CO_2$ into CO and $O_2$ in the electrical discharge of the laser.

To maintain laser power, the CO and $O_2$ must be recombined to form $CO_2$, because an $O_2$ concentration of more than few tenths of a percent will cause rapid deterioration in the power ending in unstable operation.

A method for combining CO and $O_2$ is to use a solid catalyst. To conserve energy, the catalyst must be active at or below 100° C., the temperature inside the laser envelope. The term "catalyst" as used herein, refers to an oxide-containing catalyst whether or not it contains a metallic component. Recent studies have shown that a platinum on tin oxide ($Pt/SnO_2$) catalyst is active at or below 100° C. However, reactions of $C^{18}O$ and $^{18}O_2$ with $Pt/Sn^{16}O_2$ have resulted in the formation of some $C^{16}O^{18}O$ at temperatures from 25° to 100° C. To maintain isotopic integrity of the $C^{18}O_2$ in the laser gas mixture, the reactive sites on the catalyst must also contain $^{18}O$ atoms. This can be achieved by preparing the entire oxide support with reagents containing only $^{18}O$ atoms. However, building a catalyst in this manner is very expensive. A less costly technique involves removing $^{16}O$ common-isotope oxygen atoms from active catalyst sites and replacing them with $^{18}O$ rare-isotope oxygen atoms. This latter method is the one described in this invention. The purpose of the invention is to modify the surface layer or layers of an oxide-containing catalyst, such that its reactive oxygen atoms will be the desired rare-isotope, such as $^{18}O$, and thus the product gas, $CO_2$, will contain only the desired isotope of oxygen. An oxide-containing catalyst of this type will be capable of maintaining the isotopic integrity of rare-isotope oxygen atoms in the entire closed system of the $CO_2$ laser.

It is to be understood that the following method is set forth to provide an enabling disclosure of the preparation of a particular oxide-containing catalyst. However, it is to be further understood that the method described is not limited to the particular oxide-containing catalyst. Indeed, the method described will work effectively on any oxide-containing catalyst. Several alternative embodiments will be so noted throughout the description.

A sample of the oxide-containing catalyst, $Pt/SnO_2$, to be treated is exposed to a flowing stream of reducing gas, such as $H_2$. The reducing gas should be reactive with the common-isotope oxygen atoms that are desired to be removed from the surface layer or layers of the catalyst. Furthermore, the reducing gas should be chosen so that the gas produced during the removal process can be monitored. In order to control the removal process, the reducing gas, $H_2$, is contained in an inert carrier gas, such as neon, Ne. The carrier gas should be inert with respect to the reducing gas and the surface of the catalyst. Ne may be suitably replaced by Helium, He, or any of the other Group VIII gases. The concentration of the reducing gas in the inert carrier gas is dependent upon such factors as the desired speed of the removal reaction, the cost of the reducing and carrier gases and safety.

The flowing stream of $H_2$ in Ne is maintained at a temperature in the range of 250°–450° C., preferably 300°–325° C. The advantages of performing the removal reaction at a higher temperature is that the reaction takes place faster. However, this benefit must be carefully weighed against the disadvantage of loss of integrity of the surface area of the catalyst at a higher temperature. An alternative to heating the gas before exposure would be to just heat the catalyst in an oven to the desired temperature before exposing it to the gas. Of course, both the gas and the catalyst may be heated.

The temperature chosen should be suitable for reduction of the reactive $SnO_2$ substrate oxygen to occur without damaging the catalyst structure. In addition, the reduction temperature must be higher than any at which the catalyst will subsequently be operated. The importance of this requirement is two-fold. First, in operation, the catalytic conversion in the laser occurs on the surface of the catalyst due to its relatively low operating temperature. Second, because the subsequent operating temperature of the catalyst will be lower than during the method of the present invention, diffusion of common-isotope oxygen atoms from the bulk of the catalyst during the catalytic conversion is minimized. Thus, only the surface layer or layers of the catalyst need be prepared with the rare $^{18}O$ isotope.

Sufficient $H_2$ is used to allow the removal of all common-isotope oxygen atoms in the top several layers of the $Pt/SnO_2$ catalyst. Note that only a fraction of such common-isotope oxygen atoms may actually be reactive enough to be removed at the conditions used. The oxygen removal may be easily monitored by the measurement of the $H_2{}^{16}O$ formation with a mass spectrometer. When $H_2{}^{16}O$ formation stops or falls off sharply, all of the reactive common-isotope oxygen atoms have been removed from the top several layers. Thus, the reaction need not be controlled by time.

The $SnO_2$ substrate surface is now ready to be reoxidized with the desired rare oxygen isotope $^{18}O$. The rare oxygen isotope might also be $^{17}O$. As in the removal reaction, the sample of the $Pt/SnO_2$ catalyst is exposed to the $^{18}O$ in a flowing stream of rare-isotope oxygen gas, $^{18}O_2$, within an inert carrier gas, such as Ne or any of the other Group VIII gases. The inert carrier gas should be inert with respect to both the rare-isotope oxygen and the substrate surface. Concentration of the rare-isotope oxygen in the carrier gas is dependent upon such factors as the desired speed of the reoxidation of the catalyst, the cost of the rare-isotope oxygen, and safety. The temperature of the flowing stream of the rare-isotope oxygen within the inert carrier gas should be sufficiently high to ensure that complete reoxidation of the catalyst occurs. As before, an alternative to heating the rare-isotope oxygen within the inert carrier gas would be to just heat the catalyst in an oven while exposing it to the rare-isotope oxygen in the inert carrier gas. Of course, both the rare-isotope oxygen within the inert carrier gas and the catalyst may be heated. Sufficient $^{18}O_2$ is used to allow the reoxidation process to occur in the top several layers of the $Pt/SnO_2$ catalyst where the common-isotope oxygen atoms were removed.

Once the reoxidation is complete, the catalyst is cooled in a gas that is inert with respect to the surface of the catalyst such as Ne or one of the other Group VIII gases. The catalyst is cooled to a temperature at or below its operating temperature. In this case the $Pt/SnO_2$ catalyst was cooled to 100° C.

Alternate forms of the invention include replacing $^{16}O$ atoms in the $Pt/SnO_2$ catalyst on a high surface-area to weight ratio, relatively-inert substrate, such as 10 micrometer diameter porous silica spheres. The spheres are very uniform in size and have a Brunauer-Emmett-Teller (B.E.T.) surface area of about 250 m²/g (B.E.T. is a method of measuring surface area by nitrogen absorption). The $Pt/SnO_2$ catalyst can be prepared on these spheres to a few mono-layers thickness. The process of the invention can then be applied to the coated spheres. Furthermore, while the process has been described for a Pt on $SnO_2$ substrate, the process will work effectively for any oxide-containing catalyst, with or without a metallic component, that has exchangeable oxygen atoms.

The advantages of the present invention are numerous. Common-isotope oxide catalysts or catalyst substrates may be conveniently modified for use with rare-isotope gases with minimal isotope scrambling. Furthermore, since only reactive oxygen atoms at or near the catalyst surface are replaced with rare-isotope oxygen, the cost is considerably less than if the entire oxide had to be made up of rare-isotope oxygen.

Thus, although the invention has been described relative to specific embodiments thereof, it is not so limited and numerous variations and modifications thereof will be readily apparent to those skilled in the art in the light of the above teachings. It is therefore to be understood that within the scope of the appended claims, the invention may be practiced otherwise than as specifically described.

What is claimed as new and desired to be secured by Letters Patent of the United States is:

1. A process for modifying an existing oxide-containing catalyst for use in recombining carbon monoxide molecules with diatomic oxygen molecules to form carbon dioxide, wherein said carbon monoxide molecules contain a rare isotope of oxygen which is identical to a rare isotope of oxygen which is contained in said diatomic oxygen molecules, and wherein there is no exchange of said rare isotope of oxygen with a common isotope of oxygen found in the surface of said oxide-containing catalyst, which process comprises:
   providing an oxide-containing catalyst having reactive common isotope oxygen atoms on the surface layers thereof;
   removing such reactive common isotope oxygen atoms from the surface layers of the catalyst; and
   reoxidizing the surface layers of the catalyst with rare isotope oxygen atoms, wherein each of the rare isotope oxygen atoms is a member selected from the group consisting of $^{17}O$ and $^{18}O$ isotopes.

2. A method according to claim 1 wherein said step of removing reactive common-isotope oxygen atoms from the surface layers of the catalyst comprises:
   elevating the temperature of the surface layers of the catalyst from a starting temperature below 100° C. to a temperature in the range 250°–450° C.; and
   exposing the catalyst to a reactive reducing gas to remove the reactive common-isotope oxygen atoms.

3. A method according to claim 2 wherein said step of exposing the catalyst comprises:
   passing a stream of the reactive reducing gas over the catalyst to remove the reactive common-isotope oxygen atoms.

4. A method according to claim 3 wherein the reducing gas is $H_2$.

5. A method according to claim 4 wherein the reactive reducing gas is mixed with a carrier gas.

6. A method according to claim 5 wherein the carrier gas is inert with respect to the reducing gas and the catalyst.

7. A method according to claim 6 wherein the catalyst is platinum on tin-oxide.

8. A method according to claim 7 wherein the temperature for removing the reactive common-isotope oxygen atoms is in the range of 250°–450° C.

9. A method according to claim 8 wherein the carrier gas is an inert gas selected from the group consisting of the noble gases.

10. A method according to claim 9 wherein said step of reoxidizing comprises:
    exposing the catalyst to the rare-isotope oxygen whereby the rare-isotope oxygen replaces the removed common-isotope oxygen, wherein the rare-isotope oxygen is selected from the group consisting of $^{17}O$ and $^{18}O$ isotopes; and
    cooling the reoxidized catalyst.

11. A method according to claim 10 wherein said step of exposing the catalyst comprises:
    passing a stream of the rare-isotope oxygen gas over the catalyst to replace the removed common-isotope oxygen.

12. A method according to claim 11 wherein the rare-isotope oxygen is mixed with a carrier gas.

13. A method according to claim 12 wherein the carrier gas is inert with respect to the rare-isotope oxygen gas and the catalyst.

14. A method according to claim 13 wherein the carrier gas is an inert gas selected from the group consisting of the noble gases.

15. A method according to claim 8 wherein the temperature for removing the reactive common-isotope oxygen atoms is in the range of 300°–325° C.

* * * * *